US008245790B2

(12) United States Patent
Lozier

(10) Patent No.: US 8,245,790 B2
(45) Date of Patent: Aug. 21, 2012

(54) FIREFIGHTING DEVICE FEEDBACK CONTROL

(75) Inventor: Todd Brian Lozier, Elkhart, IN (US)

(73) Assignee: Elkhart Brass Manufacturing Corporation, Inc., Elkhart, IN (US)

(*) Notice: Subject to any disclaimer, the term of this patent is extended or adjusted under 35 U.S.C. 154(b) by 1063 days.

(21) Appl. No.: 12/174,866

(22) Filed: Jul. 17, 2008

(65) Prior Publication Data

US 2009/0101368 A1 Apr. 23, 2009

Related U.S. Application Data

(60) Provisional application No. 60/950,137, filed on Jul. 17, 2007.

(51) Int. Cl.
*A62C 2/00* (2006.01)
(52) U.S. Cl. ............... 169/43; 169/24; 169/52; 169/54; 169/56; 169/70; 239/69; 239/160; 239/166; 239/587.1; 239/587.2; 700/283; 701/50; 285/920
(58) Field of Classification Search ............. 169/24, 169/25, 43, 46, 52, 54, 56, 70; 239/69, 159, 239/160, 164, 166, 587.1–587.3; 700/283; 701/50; 285/277, 912, 920
See application file for complete search history.

(56) References Cited

U.S. PATENT DOCUMENTS

| | | | |
|---|---|---|---|
| 4,949,794 A | 8/1990 | Petit et al. | |
| 5,899,276 A * | 5/1999 | Relyea et al. | 239/164 |
| 6,772,845 B1 | 8/2004 | Janson | |
| 7,191,964 B2 * | 3/2007 | Trapp | 169/24 |
| 7,243,864 B2 * | 7/2007 | Trapp et al. | 169/24 |
| 7,451,028 B2 * | 11/2008 | Pillar et al. | 701/50 |
| 2001/0013555 A1 | 8/2001 | Egashira et al. | |
| 2003/0130765 A1 | 7/2003 | Pillar et al. | |
| 2007/0061054 A1 | 3/2007 | Rowe et al. | |

FOREIGN PATENT DOCUMENTS

| | | |
|---|---|---|
| JP | 04138176 | 5/1992 |
| WO | WO2004/102105 A1 | 11/2004 |

OTHER PUBLICATIONS

Extended European search report dated Sep. 19, 2011 from related European patent application No. 08781957.9.
Search Report dated Dec. 9, 2008, for corresponding PCT International Application No. PCT/US2008/070293.
STNEWS Staff Writers, New Monitor Position Indicator Safely Aims Water Stream at Fire, Security Technology News, dated Feb. 2006, http://www.stnews.com/fire,_rescue_&_safety/articles/177480000/new_monitor_position_indicator_safely_aims_water_stream_at_fire.html. accessed Mar. 27, 2012.

* cited by examiner

*Primary Examiner* — Steven J Ganey
(74) *Attorney, Agent, or Firm* — Faegre Baker Daniels

(57) ABSTRACT

A control system for a fire fighting component includes a detector for detecting a position of at least a portion of a fire fighting component relative to an axis, which generates an output position signal indicative of the position of the at least a portion of the fire fighting component, and a controller in communication with the detector and receiving the output position signal. The controller generates a display output signal based on the output position signal. The system further includes a display that is in communication with the controller and receives the display output signal. The display generates an icon that is a graphical representation of the fire fighting device, and configures the icon based on the output display signal wherein the configuration of the icon indicates the position of the at least a portion of the fire fighting device.

26 Claims, 9 Drawing Sheets

FIREFIGHTING DEVICE FEEDBACK CONTROL

This application claims the benefit of provisional application, entitled MONITOR FEEDBACK CONTROL filed Jul. 17, 2007, Ser. No. 60/950,137, which is herein incorporated by reference in its entirety.

TECHNICAL FIELD AND BACKGROUND OF THE INVENTION

The present invention relates to fire fighting equipment and, more specifically, to the control of the position and orientation of fire fighting equipment, including monitors, valves, extenders, or the like, and to control the relative position of the firefighting equipment to other components, including for example ladders, lights or the like on a fire truck.

Traditional monitors use hard mechanical stops or programmable soft stops to control the minimum/maximum ranges of travel. However, the limits only affect a single axis of motion and only provide two points of control—maximum travel in either direction.

However, none of these systems provide for a means to have "infinite" control of the monitor travel and/or its limits of travel. At best, current systems are used to provide end stops for a single axis of movement or provide discretely variable end stops for a single axis of movement.

When the control over the monitor position and orientation is improved the ability to fight a fire and the safety of its responders are enhanced.

Accordingly, there is a need to provide even greater control over a monitor's position and orientation.

SUMMARY OF THE INVENTION

Accordingly, the present invention provides a control system that offers enhanced control over the position and orientation, including relative position and orientation, of a fire fighting device or component and enhanced information about the position and orientation of the fire fighting device or component.

In one form of the invention, a control system for a fire fighting component includes a detector for detecting a position of at least a portion of the fire fighting component relative to an axis, a controller in communication with the detector, and a display. The detector generates one or more output position signals indicative of the position of the at least a portion of the fire fighting component. The controller receives the output position signal and generates a display output position signal based on the output position signal. The display is in communication with the controller and receives the display output signal and, further, generates an icon, which is a graphical representation of the fire fighting device. In addition, the display configures the icon based on the output display signal wherein the configuration of the icon indicates the position of the fire fighting device or portion thereof.

In one aspect, the control system is in combination with the fire fighting device. For example, the fire fighting device may comprise a fluid delivery device, such as a monitor and/or a nozzle.

In a further aspect, when used in connection with a monitor, the monitor typically is rotatable about a base, with the detector generating an output position signal indicative of the rotational position of the monitor about the base.

In another aspect, the monitor includes an outlet, which is rotatable about an axis. The detector generates an output position signal indicative of the rotational position of the outlet about the axis.

When used in connection with a nozzle, the detector may output a signal indicative of the position or orientation or the nozzle, including the position of the nozzle tip so that the amount or type of flow from the monitor can be controlled.

According to yet a further another aspect, the fire fighting device comprises a monitor with an adjustable nozzle that has an extendible nozzle body that is extendible along a nozzle axis. The detector may be configured to generate an output position signal that is indicative of the linear position of the nozzle body relative to the nozzle axis.

In yet another aspect, the icon includes a first icon portion and a second icon portion, with the second icon portion being movable with respect to the first icon portion, and the second icon portion indicating the angular position of the nozzle body.

In another form of the invention, a control system for a fire fighting component includes a detector for detecting a position of at least a portion of the fire fighting component relative to an axis and a controller which is in communication with the detector. The detector generates at least one output position signals indicative of the position of the at least a portion of the fire fighting component, which is received by the controller. The system further includes an input device that is operative to generate an input position signal to the controller, which adjusts the position of the at least a portion of the fire fighting component in response to the input position signal based on the output position signal of the detector.

In one aspect, the control system is in combination with the fire fighting device. For example, the fire fighting device may comprise a fluid delivery device, such as a monitor. In a further aspect, the monitor is rotatable about the base, with the detector generating an output position signal indicative of the rotational position of the monitor about the base.

In another aspect, the monitor includes an outlet, which is rotatable about an axis, with the detector generating an output position signal indicative of the rotational position of the outlet about the axis.

In yet another aspect, the system includes a second detector. The monitor includes an outlet, which is rotatable about an axis, with the second detector generating an output position signal indicative of the rotational position of the outlet about the axis. The controller then adjusts the position of the monitor about the base and/or the outlet about the axis based on the input position signal and the output position signals of both detectors.

According to yet another aspect, the monitor includes an adjustable nozzle that has an extendible nozzle body that is extendible along a nozzle axis, with the detector detecting the position of the nozzle body relative to the nozzle axis. Further, the controller adjusts the position of the nozzle body in response to the input position signal based on the output position signal of the detector.

In a further aspect, the system also may include a display in communication with the controller, which generates a display output signal based on the output position signal from the detector. The display generates an icon based on the display output signal, which is a graphical representation of the monitor. Further, the display configures the icon based on the output display signal wherein the configuration of the icon indicates the position of the monitor. For example, the icon may include a first icon portion and a second icon portion, the second icon portion being movable with respect to the first icon portion to indicate the angular position of the monitor.

According to yet another form of the invention, a method of controlling the position of a fire fighting device includes detecting the position of the fire fighting device, generating an output position signal based on detecting the position, generating an input position signal, and adjusting the position of the fire fighting device based on the input position signal and the output position signal.

In aspect, detecting the position of the fire fighting device includes detecting the position of the fire fighting device with respect to two axes. In this form, an output position signal is generated for each axis, and the position of the fire fighting device is adjusted relative to at least one of the axes based on the input position signal and the output position signals.

In yet another form of the invention, a method of indicating the position of a fire fighting device includes detecting the position of the fire fighting device, generating an output position signal based on the detecting, and generating an icon based on the output position signal. The icon is configured as a geometrical representation of the fire fighting device, with the configuration of the icon changing to indicate the position of the fire fighting device based on the input position signal.

In one aspect, the position of the fire fighting device is detected with respect to two axes, and an icon is generating for each axis.

Accordingly, the present invention provides a control system that offers enhanced control over the position and orientation of a fire fighting device or component and enhanced information about the position and orientation of the fire fighting device or component.

These and other objects, advantages, purposes, and features of the invention will become more apparent from the study of the following description taken in conjunction with the drawings.

DETAILED DESCRIPTION OF THE PREFERRED EMBODIMENT

Figure 1:
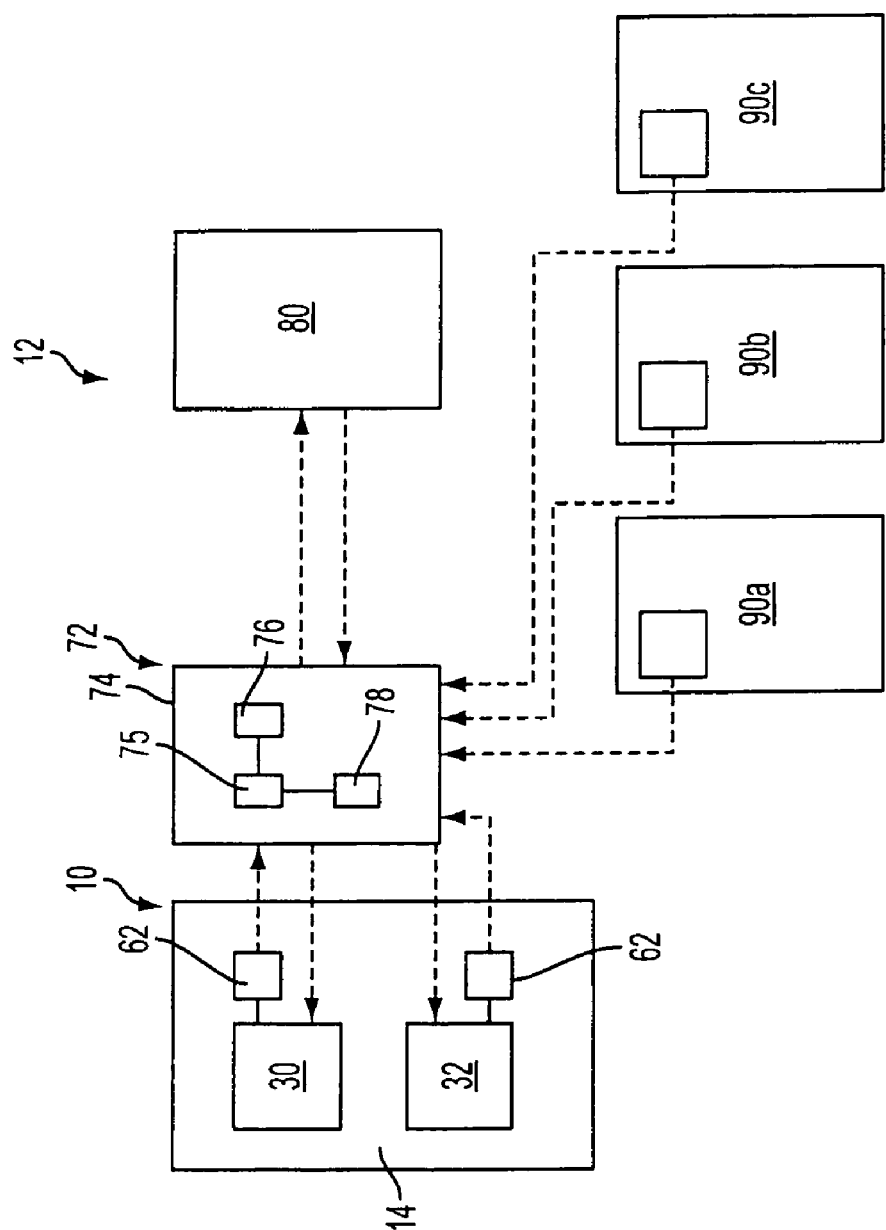
FIG. 1 is a schematic drawing of the fire fighting device and control system of the present invention.

Referring to FIG. 1, the numeral 10 generally designates a fire fighting device or component that is controlled by a control system 12 of the present invention. As will be more fully described below, control system 12 comprises a closed loop feedback system that can detect the position of the fire fighting device and reposition the fire fighting device to essentially in an infinite number of positions and, further, displays the fire fighting device in the essentially infinite number of positions in a clear and easily interpreted manner to provide position information to a user, such as a fire fighter to enhance the control over the fire fighting device. Although the foregoing description is made to the fire fighting device in the form of a fluid delivery device and, more specifically, to a monitor 14, it should be understood that the control system of the present invention may be used in conjunction with other devices, including valves, deck gun elevators, ladders or the like.

Figure 2:
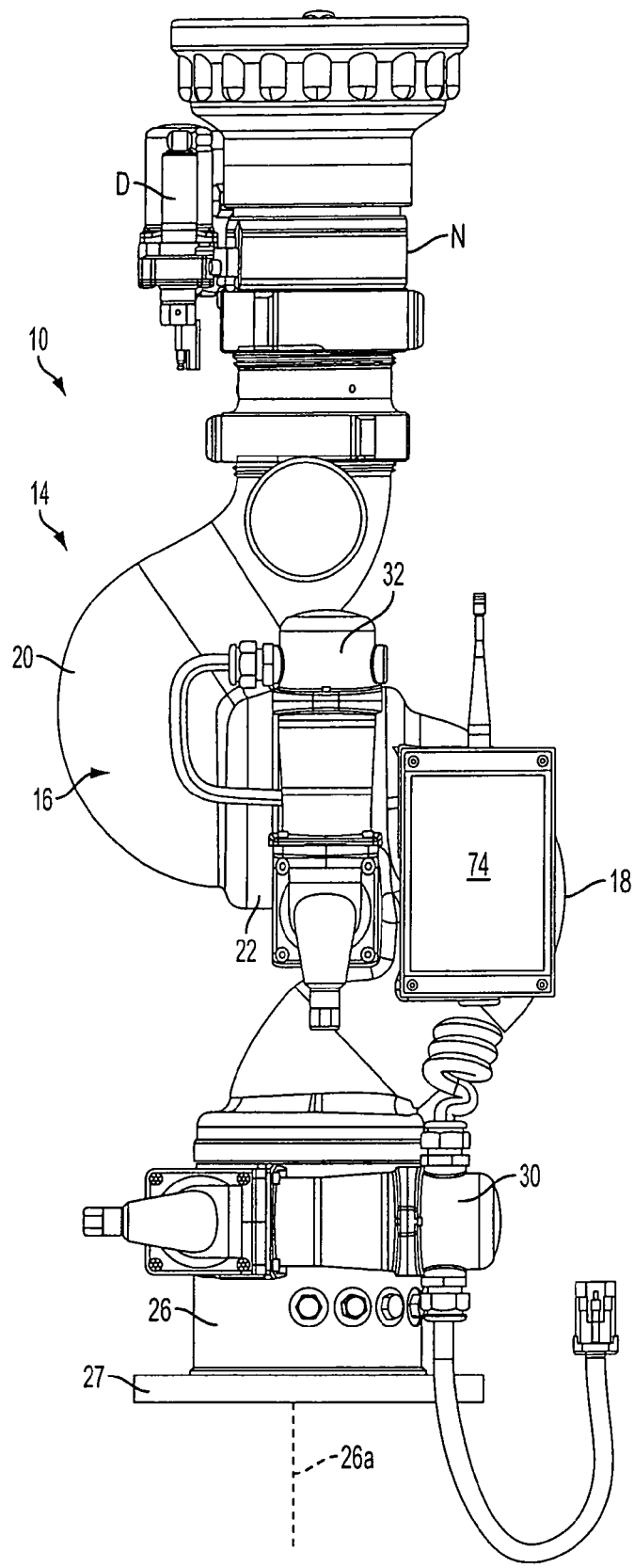
FIG. 2 is an elevation of one embodiment of the fire fighting device of the present invention.
Figure 6:
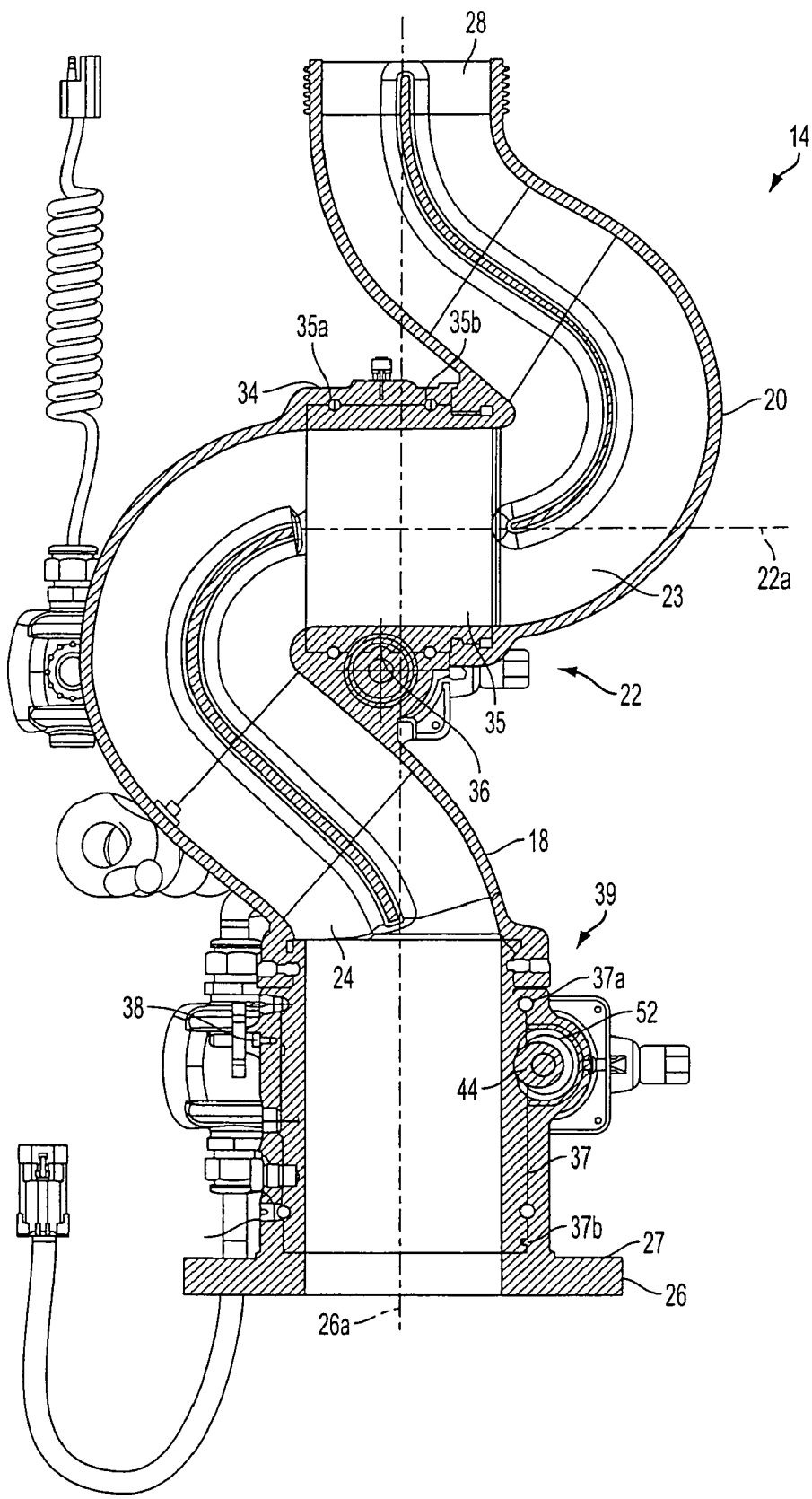
FIG. 6 is cross-section view taken through the monitor of FIG. 2 with the detector removed.
Figure 7:
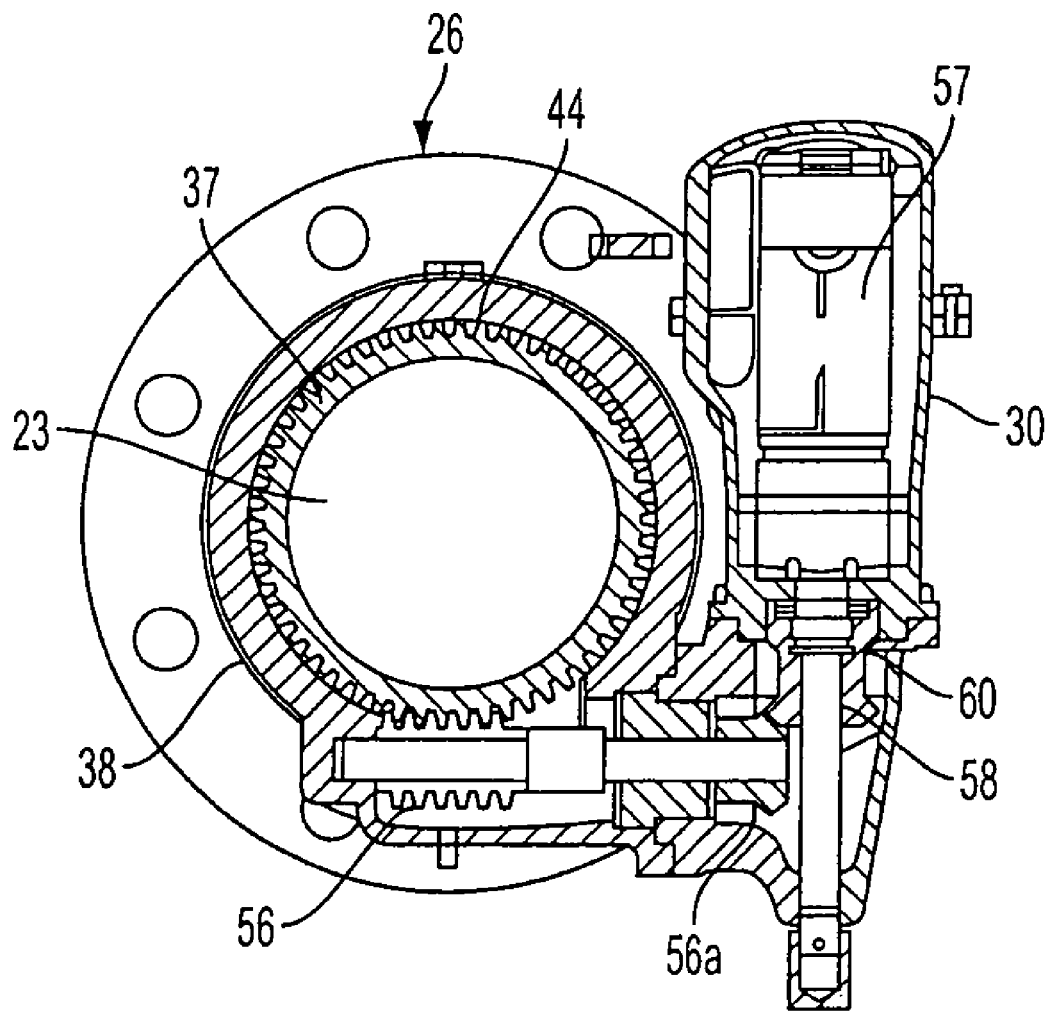
FIG. 7 is a cross-section view taken through the base of the monitor of FIG. 2 with the detector removed.

Referring to FIGS. 2 and 6, monitor 14 includes a housing 16 formed from two or more pipe sections 18, 20 that are interconnected using a conventional sealed pivot joint 22 to form a fluid passageway 23 therethrough. Pipe section 18 comprises a generally U-shaped pipe section, and pipe section 20 similarly comprises a generally U-shaped pipe section so that the passageway formed through housing has a generally S-shaped path. It should be understood that the present invention is also applicable to monitors with different configurations and to other fire fighting components.

In the illustrated embodiment, pipe section 18 forms an inlet 24 and is rotatably mounted to a base 26 about a first axis 26a. Base 26 includes a flange 27 that is adapted for mounting to a fire truck to provide a fixed base, which provides a point of rotation for housing 16 about axis 26a and further allows housing 16 to be rotated up to and through a 360 degree arc and multiples thereof. Pipe section 20 forms an outlet 28, which is adapted for mounting a nozzle, such as a fixed nozzle or an adjustable nozzle, to the monitor, so that when pipe section 18 is rotated in base 26, outlet 28 (and the nozzle mounted thereto) can pan through a horizontal plane through an infinite number of angles between 0 degrees and 360 degrees (and multiples thereof). An illustrative example of a nozzle N is depicted in FIG. 2. Other types of nozzles can, of course, be used.

As noted above, housing 16 is formed from two or more pipe sections 18 and 20 that are interconnected by pivot joint 22, which allows outlet 28 to be pivoted about pivot axis 22a and thereby raised or lowered relative to the base. To rotate housing 16 in base 26 and raise or lower outlet 28, monitor 14 is provided with a drive mechanism 30, 32 for each respective pivot axis so that pipe section 18 can be rotated in base 26 independent of the rotation of pipe section 20 relative to pipe section 18. In addition, where an adjustable nozzle is mounted to outlet pipe section 26, monitor 10 may incorporate a drive mechanism or actuator to adjust the shape of the stream.

Pivot joint 22 is formed by enlarged collar 34, which is formed at the outlet end of pipe section 18, and a pipe section 35 that is coupled to the inlet end of pipe 20 and which includes bearings 35a and 35b (FIG. 6) that ride on grooves formed in the outlet end of pipe section 18. Further, pipe section 35 includes a plurality of gear teeth 36, which extend around at least a portion of the circumference of pipe section 35 and which are driven by drive mechanism 32, described in more detail below. Similarly, pipe section 18 includes a pipe section 37 that is coupled to the inlet end of pipe 18, which extends into upstanding pipe section 38 and includes a plurality of bearings 37a and 37b that ride on grooves formed in the upstanding pipe section 38. In addition, pipe section 37 includes a plurality of gear teeth 44, which extend around the full circumference of pipe section 37, and are driven by drive mechanism 30. In this manner, gear teeth 44 allow for a full 360° rotation or greater of monitor 14 on base 26. Though it should be understood that the gear teeth may provided only over a portion of the pipe section circumference.

As best seen in FIG. 6, gear teeth 44 of pipe section 37 are aligned with an opening 52 formed in pipe section 38 of base 26 so that teeth 44 are accessible through opening 52 to be driven by drive mechanism 30. Drive mechanism 30 is mounted to base 26 and includes a worm gear 56 that is aligned with opening 52 and meshes with gear teeth 44. Drive mechanism 30 includes a motor 57, a drive shaft 58 with a drive gear 60, which drives worm a driven gear 56a on worm gear 56. In this manner, when worm gear 56 of drive mechanism 30 is rotated, pipe section 18 will rotate about pivot axis 26a.

Drive mechanism 32 is of similar construction to drive mechanism 30 and includes a worm gear 56, a motor 57, a drive shaft 58, and a drive gear 60 that drives worm gear 56. Drive mechanism 32 is mounted to pipe section 18 at collar 34 and further aligned with gear teeth 36, with its worm gear 56 meshing with teeth 36 through an opening provided in collar 34. In this manner, when gear 56 of drive mechanism 32 is rotated, pipe section 20 will rotate about pivot axis 22a.

Further, where an adjustable nozzle is mounted to monitor 14 at outlet 28, a third drive mechanism may be provided to move the nozzle body to vary the stream flowing from the nozzle. For example, when moved, the nozzle body will vary the configuration of the stream between a straight stream flow or a wide or "fog" flow. Similarly, a detector may be mounted to the drive shaft of the nozzle drive mechanism, which will provide direct feed back to the controller of the configuration of the nozzle. As noted above, the position of monitor 14 (and optionally the configuration of the nozzle) is controlled by control system 12. In the illustrated embodiment, control system 12 includes a plurality of detectors 62, each associated with a drive mechanism (30, 32, and a drive mechanism D for the nozzle). In the illustrated embodiment, detectors 62 comprise position transducers, such a rotary potentiometers, which detect the rotary position of the respective worm gears 56 of the drive mechanisms (30, 32 or nozzle drive mechanism D), which can be used as a direct measure of the angular position of pipe section 18 around axis 26a and the angular position of pipe section 20 around axis 22a (and optionally the linear position of the nozzle body along the nozzle axis). The detectors may have a signal read head and generate a signal data signal or multiple read heads, which generate more than one data signal. When using multiple (binary or tertiary etc) signals, one signal may be used for redundancy, for example as "back-up" signal, or may used to provide additional information. For example, one signal may have a different ramp rate (i.e. the amount of change in the feedback signal level as a function of one revolution) or non-linear feedback ramp rates, for example in programmable position devices. This may provide the opportunity to implement "fine" control in one area and "coarse" control in another area of the travel zone. Further, a signal may be used as a "switch". For example, a programmed feedback value can trigger a switch signal. This could eliminate the need for additional sensors, for example, hall sensors, and instead all the sensing associated with the monitored component to be combined into one positioning device.

Figure 5:
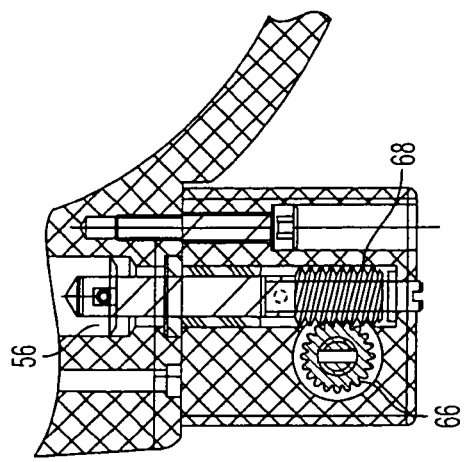
FIG. 5 is a cross-section taken along line V-V of FIG. 3.
Figure 4:
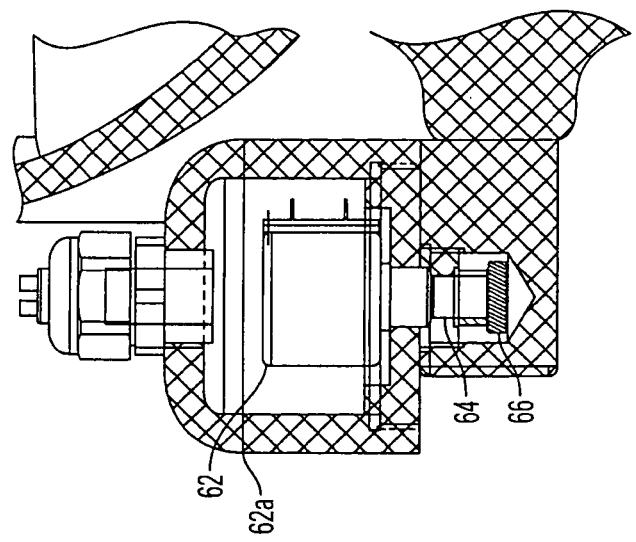
FIG. 4 is a cross-section taken along line IV-IV of FIG. 3.
Figure 3:
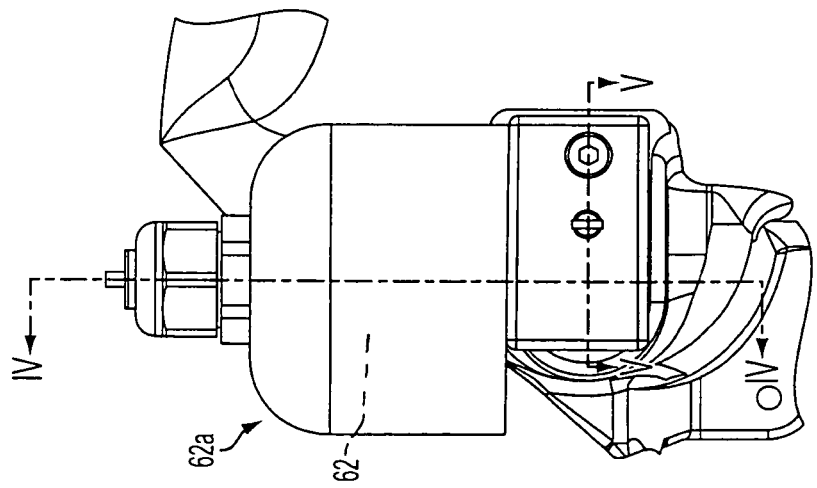
FIG. 3 is an enlarged view of one embodiment of a detector of the control system.

Referring to FIGS. 4-5, each detector 62 is mounted adjacent the terminal end of the respective worm gear (56). In the illustrated embodiment detector 62 includes a housing 62a and a rotary shaft 64 with a gear 66 that meshes with a worm gear 68 that is coupled to the end of the worm 56 of the respective drive mechanism. It should be understood that as noted above other types of detectors may be used, including for example detectors that measure a change in resistance, voltage, current, inductance, capacitance, including hall effect sensors. Further, light sensors may be used, including infrared light or ultraviolet light sensors, which use light to measure a change in position via a pulsing of the light source passed through a component coupled to the moving axis or light source reflected from a component coupled to the moving axis.

Control system 12 also includes a control module 72 that is mounted to a circuit board and located in a housing 74 (FIG. 2), which in turn is mounted to monitor 14, for example, by a bracket. For an example of RF control of the respective drive mechanisms, reference is made to copending application United States patent application, entitled FIRE-FIGHTING MONITOR WITH REMOTE CONTROL, Ser. No. 10/984,047, filed Nov. 9, 2004 (which is incorporated by reference herein in its entirety. Control system 12 also includes an input device 76, such as a key pad, buttons or a remote control device, which is used to generate input position signals to the control module to select the desired position and/or orientation of the monitor and optionally the configuration of the nozzle, as noted above. Control module 72 is in communication with detectors 62 and receives output position signals from detectors 62 that are indicative of the position of the monitor about axis 26a and of outlet 28 about axis 22a (and optionally nozzle body position along the nozzle axis). As noted above, each detector 62 may generate one or more signals. Further control module 72 is in communication with a power source, for example an onboard power source noted below or an external power source, to selectively drive the respective drive mechanisms.

Referring to again to FIG. 1, control module 72 includes a controller 75, such as a microprocessor, drive circuitry for driving the drive mechanisms, and optionally a receiver so that a remote input device may be used to control the position or orientation of the monitor. As noted above, housing 74 also optionally houses a power source 78, including a rechargeable battery, which powers control module 72 to the drive mechanisms so that monitor 14 may comprise a stand alone unit. Alternately, the controller as well as the drive mechanisms may be powered from an external power supply through electrical wiring or cables. Further, control system 12 includes a display 80 to display position information, which is more fully described below.

Using the output position signals from detectors 62, control system 12 monitors the position of the monitor 10 (as well as outlet 28 and/or nozzle) and further adjusts the position of the monitor about axis 26a and/or the position of outlet about axis 22a by driving one or more of the drive mechanisms in response to input position signals from the input device 76 to thereby form a closed feedback loop control system. Thus, control module 72 provides infinite control over the monitor axis of travel and may control all axes simultaneously to provide coordinated control over the monitor axes, as well as the configuration of the nozzle. Further, control module 72 may incorporate a memory storage device for storing data and also software which may provide programmed control over the position of the monitor of each axis of travel and optionally the position of the nozzle body. For example, control module 72 may incorporate a program that provides pre-programmed multi-axis oscillation, for example, horizontal vertical and/or nozzle oscillation.

Further, control module 72 may be in communication with other devices 90a, 90b, and 90c (FIG. 1) or other controllers on the truck to coordinate the movement of the monitor with other fire fighting devices or components on the truck. For example, control logic can be expanded to provide for targeted movement of the monitor in coordination with other devices. If a ladder needs to be repositioned, it is possible that the operator could enter a "range to target" at which point the programmable logic could read the ladder movements and keep the monitor on target during the repositioning. Similarly, the display may incorporate icons for the other devices. For example, valves, a ladder, etc can be programmed to be displayed visually as well. If incorporated with a touch screen or touch key control device—operation of the truck devices could be reduced to a very small package. For example, large pump panels could be reduced to a screen of less than a couple square feet.

Control module 72 may also have stored thereon a software program, such as a "safe zone" program, which maps the position of the monitor in 3D space and, further maps the position or status of other components on the truck, for example, a ladder, the truck cab, an extendible light, a valve, or the like. If the truck has a ladder, raised cab, or extendable light, for example, that is presently "in the possible path" of the monitor—hitting either item while water is flowing could generate significant damage to the truck, ladder, cab or light. For example, monitor axis of travel could be stopped when it reach an obstruction until the operator moves another monitor axis to eliminate the obstruction; monitor axis could be pre-programmed to "self clear" (i.e. as you move horizontally towards a truck light, the monitor has a ramp-up routine to raise itself and not hit). Further, signal lights or buzzers may be incorporated into control system 12 to indicate obstruction or obstruction approach. Additionally, valves may be controlled such that valves can not be opened if the monitor is at an obstruction. In this scenario, obstructions may be programmed on or off depending on the water flow condition.

Where monitor 10 comprises an extended travel monitor, for example that is mounted on the lower side of a ladder that has a fly extension. When the fly extension is retracted, the monitor has greater upward vertical travel. When the fly extension is extended, control system 12 may be configure to limit the monitor vertical travel so it can not raise up and hit the fly extension. It should be understood that many other scenarios may be programmed into the control module, and the listed scenarios are exemplary only.

In addition to actuating the drive mechanisms (and actuator) and detecting the position of the monitor and outlet (and optionally nozzle body) based on the output signals from detectors 62, control system 12 is configured to display the position of the monitor relative to the base and the position of the outlet (and nozzle) relative to pipe section 18. As noted above, control module 72 receives signals from detectors 62, which may be analog or digital signals, and processes the output position signals from detectors 62 and generates output display signals for a display 80, which is configured to display the position of the monitor both relative to the vertical axis and the horizontal axis based on the output display signals output from control module 72.

In the illustrated embodiment, detectors 62 comprise potentiometers and output analog signals, in which case control module 72 optionally includes an analog to digital (A/D) converter to convert the detectors' analog signals into digital signals, which are then processed as the output display signals. In this manner, control system 12 comprises a closed loop feedback system that can accurately detect and control the position of the monitor, its outlet and nozzle and further display the position of the monitor, outlet and nozzle over its full range of motion. Additionally, as noted above, by providing enhanced control over the position of the monitor and its outlet and nozzle, control system 12 may use input from other sources, such as positional information relative to other components on the truck, to minimize the risk of interaction with monitor and other devices on the truck.

Figure 8A:
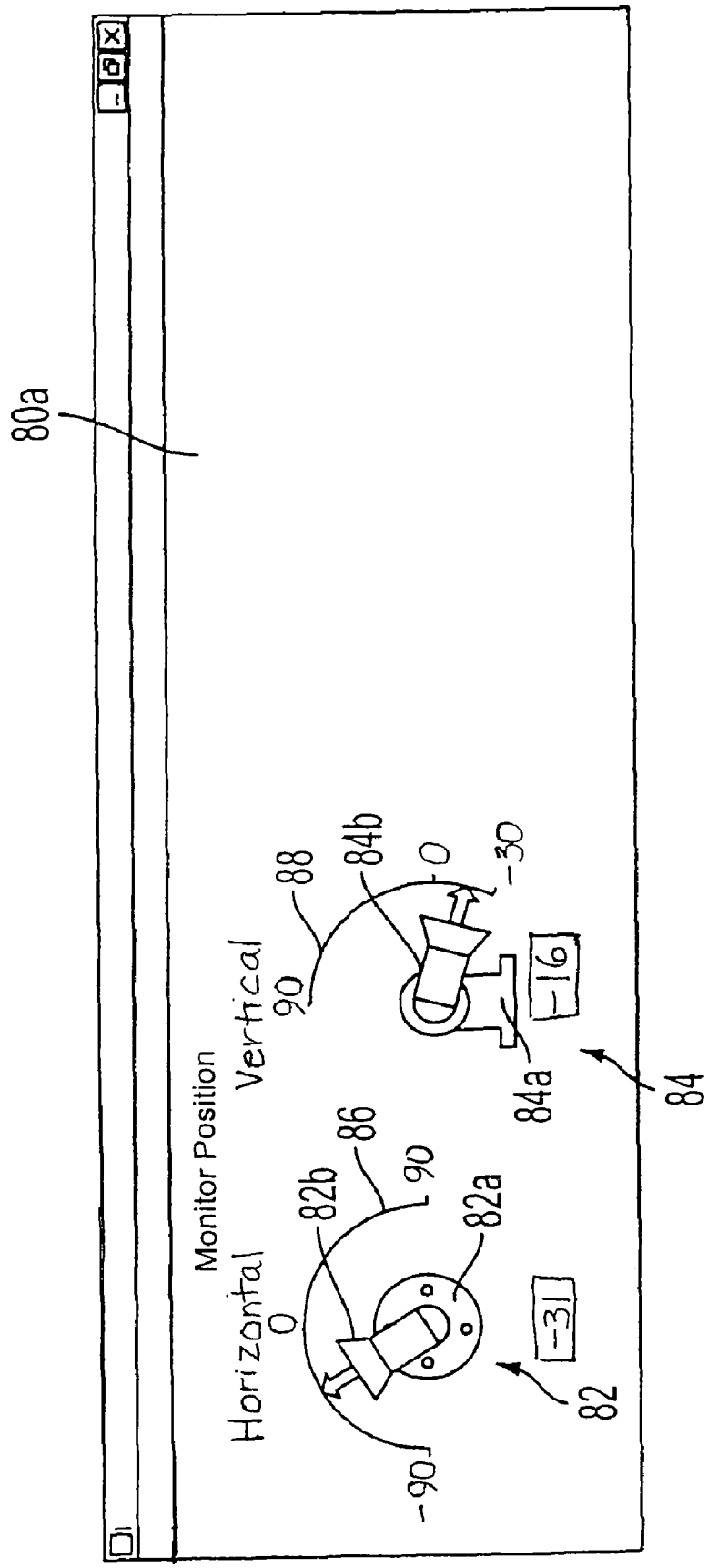
FIGS. 8A-8C illustrates a first embodiment of a display with icons and angular position scales to illustrate several positions of the monitor and monitor outlet.
Figure 8B:
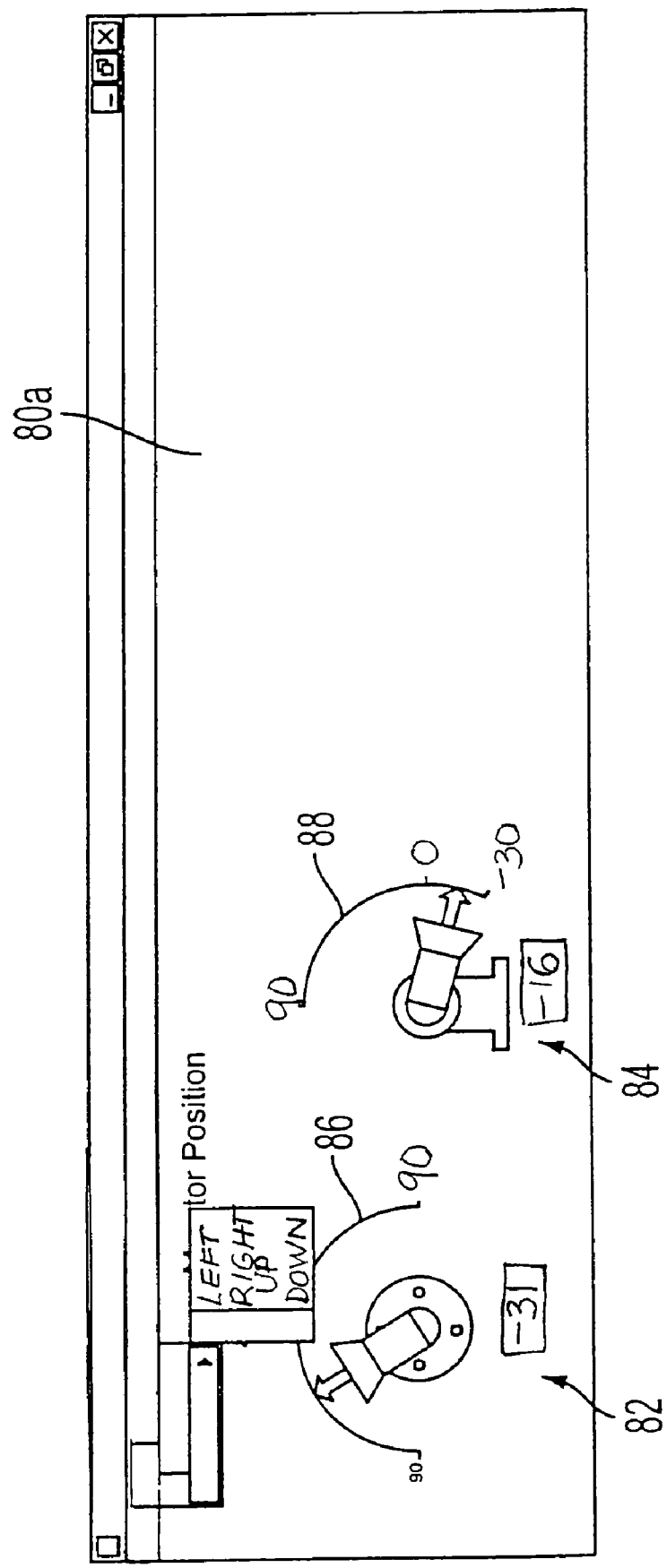
Figure 8C:
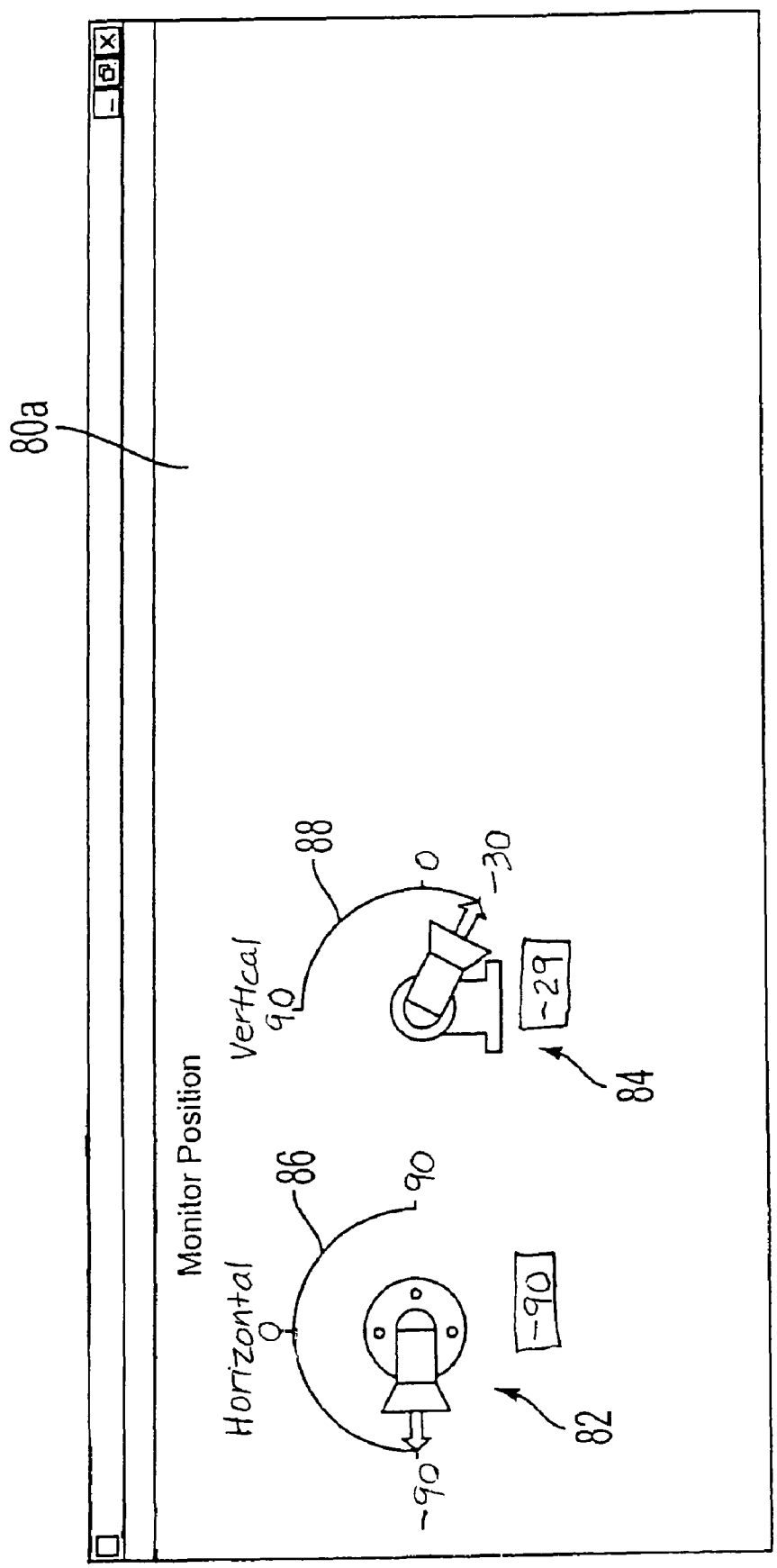

Referring to FIG. 8A-8C, display 80 may comprise a display monitor, including a display monitor on a laptop computer. In the illustrated embodiment, display 80 includes a screen 80a with a plurality of icons 82 and 84, which may comprise graphical representations of the fire fighting device, for example monitor 10, from several views. In the illustrated embodiment icon 82 comprises a graphical representation of monitor 10 from a plan view and includes a first icon portion 82a that is representative of the base 26 and a second icon portion 82b that is representative of the housing 16. Further, icon 82 is positioned adjacent an angular scale formed from an arcuate line 86 that provides an angular scale with an infinite number of angular positions and at least three points with angular values associate therewith.

Icon 84 similarly includes a first icon portion 84a that is representative of the base 26 and pipe section 18 and a second icon portion 84b that is representative of pipe section 20 (and nozzle mounted to outlet 28). Icon 84 is similarly is positioned adjacent an angular scale formed from an arcuate line 88 that provides an angular scale with an infinite number of angular positions and at least three points with angular values associate therewith.

As note above, control module 72 generates display output signals to display 82, which then adjusts the orientation of icons 82 and 84 based on the display output signals from control module 72. As noted above, display 80 may comprise a display of a laptop and, therefore, may include its own processor for processing the signals from controller 72. Alternately, as describe below, the display may simply comprise a companion monitor display and have a display driver rather than a central processor as in the case of a laptop.

In this manner, display 80 provides positional information for the monitor in a clear and easily interpreted manner for a user, such as a fire fighter, which may enhance the control over the fire fighting device. Optionally, screen 80a may comprise a touch screen with the icons being manipulatable by a user to form an input device to control module 72. For example, a user may simply touch icon portion 82b and drag the icon portion in an arcuate path to generate position input signals to module 72 to reposition the monitor about axis 26a. Similarly, icon portion 84b may be dragged to reposition outlet 28 of monitor 10 about axis 22a.

Figure 9:
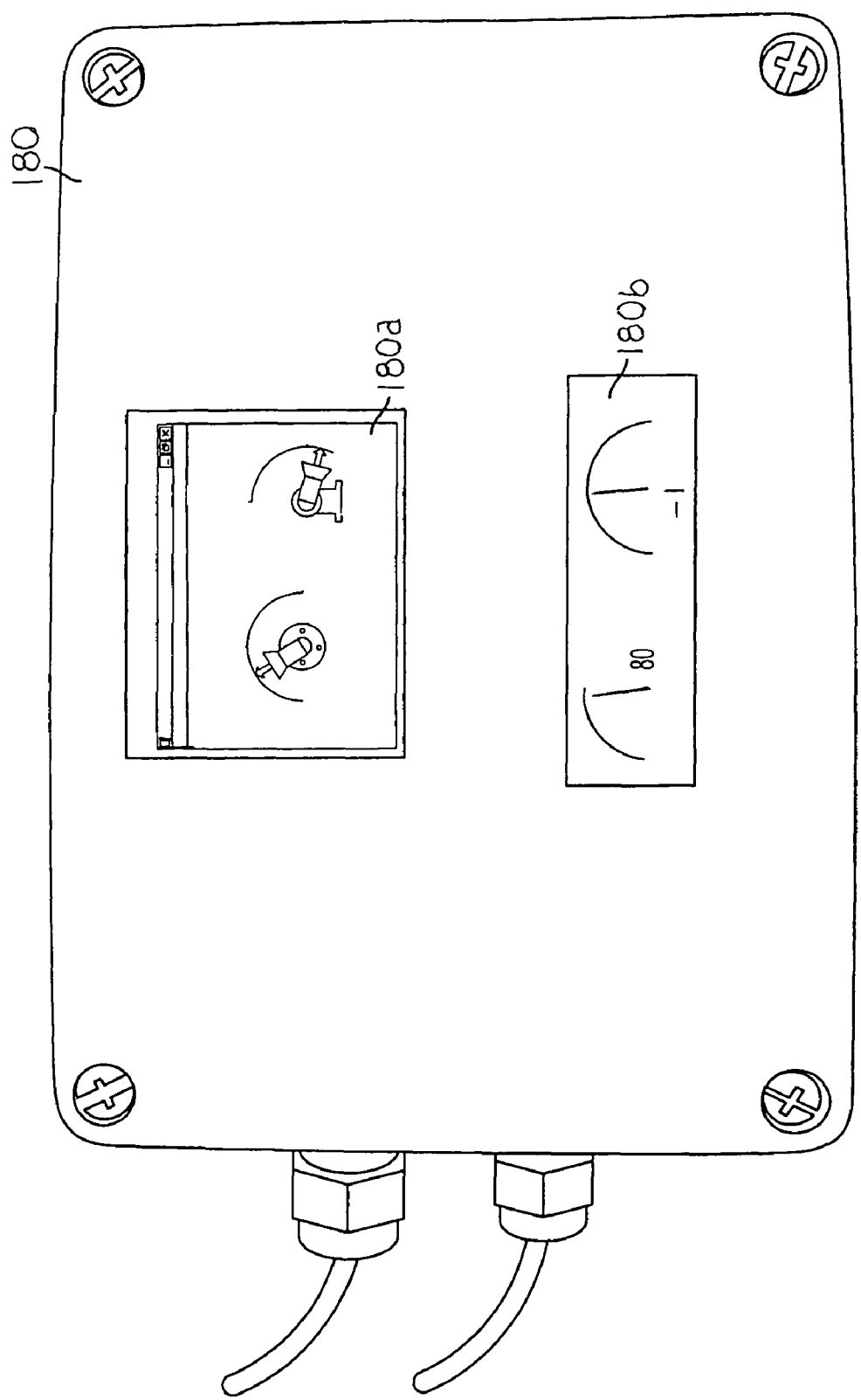
FIG. 9 illustrates another embodiment of a display with two screens with icons and angular position scales to illustrate several positions of the monitor and monitor outlet.

Referring to FIG. 9, the numeral 180 designates another embodiment of a display. In the illustrated embodiment display 180 is housed in an enclosure, for example, aluminum housing, which may be portable. Display 180 includes two screens 180a and 180b, with screen 180a being provided, for example, on a Windows Mobile 5 based Companion Display, such as HP IPAQ, which is configured in a similar manner as screen 80a with multiple ions, each with an icon portion to represent the movable portion of the monitor and each with an scale with an infinite number of angular positions to show the angular orientation of the movable portion of the monitor. Screen 180b is provided, for example, on a vacuum florescent display (VFD), and includes arcuate scale 186 and 188 similar to scales 86 and 88 of screen 80a but with a numerical read out of the actual position of the monitor and/or its outlet and nozzle. Thus display 180 provides numerical information relative to the position of the monitor and/or its outlet and nozzle, as well as graphical information.

As noted above, control module 72 receives signals from detectors 62 and further outputs signals to the displays. It should be understood that the signals may be transmitted using cables, including optical cables, or may be transmitted wirelessly through radio frequency transmission, though it should be understood that infrared transmission may also be used where the components are in close range and unlikely to experience interference. For example, a Bluetooth device may be used, as well as other RF transmitters or transceivers, to transmit the respective signals.

It will be understood from the foregoing description that the basic structure of the monitor can vary greatly, and in the illustrated embodiment comprises a monitor commercially available from Elkhart Brass under the trademark SCOR- PION. Further, as noted above, monitor 10 may include an adjustable nozzle. In which case, as noted above, the shape of the stream from the nozzle may be adjusted by a nozzle drive mechanism or actuator, such as the actuator available under part number 81185001 from Elkhart Brass Manufacturing Co., Inc. of Elkhart, Ind. Similar to drive mechanisms 30 and 32, the actuator may be remotely controlled by control system 12 so that the entire operation/control of monitor 10 can be controlled by control system 12. Although described primarily in reference to the operation of a monitor on a fire truck, the present system may be used to control other firefighting devices.

While several forms of the invention have been shown and described, other changes and modifications will be appreciated by those skilled in the relevant art. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

The invention claimed is:

1. A control system for a fire fighting device, said control system comprising:
   a detector for detecting a position of at least a portion of the fire fighting device relative to an axis said detector generating an output position signal in of the position of the first portion of the fire fighting device;
   a controller in communication with said detector and receiving said output position signal, said controller generating a display output signal based on said output position signal; and
   a display in communication with said controller and receiving said display output signal, said display generating a manipulatable icon, said icon being a graphical representation of the fire fighting device, said display configuring said icon based on said output display signal wherein the configuration of said icon indicates the position of the at least a portion of the fire fighting device, said display generating an input position signal in response to a manipulation of said icon, and said controller adjusting the position of the at least a portion of the fire fighting device in response to said input position signal.

2. The control system according to claim 1, wherein said fire fighting device comprises a fluid delivery device.

3. The control system according to claim 2, wherein said fluid delivery device comprises a monitor.

4. The control system according to claim 3, further comprising a base, said monitor being rotatable about said base, said detector generating, an output position signal indicative of the rotational position of said monitor about said base.

5. The control system according to claim 3, said monitor including an outlet, said outlet being rotatable about an axis, said detector generating an output position signal indicative of the rotational position of said outlet about said axis.

6. The control system according to claim 3, further comprising a nozzle and a second detector, said second detector generating an output position signal indicative of the configuration of the nozzle.

7. The control system according to claim 1, wherein in said icon includes a first icon portion and a second icon portion, said second icon portion being movable with respect to said first icon portion, said second icon portion indicating the angular position of the at least a portion of the fire fighting device.

8. The control system according to claim 1, wherein said detector generates output position signals indicative of the position of the at least a portion of the fire fighting device.

9. The control system according to claim 8, wherein one of said output position signals has a different ramp up rate than the other signal or signals.

10. The control system according to claim 1 further comprising a second detector for detecting a position of a second portion of the fire fighting device relative to an axis, said detector or generating a second output position signal indicative of the position of the second, portion of the fire fighting device, the controller being in communication with said second detector and receiving said second output position signal, said controller generating a second display output signal based on said second output position signal;
   wherein said display generates a second manipulatable icon, said second icon being a graphical representation of the second portion of the fire fighting device, said display configuring said second icon based on said second output display signal wherein the configuration of said second icon indicates the position of the second portion of the fire fighting device, said display generating a second input position signal in response to manipulation of said second icon; and said controller adjusting the position of the second portion of the fire fighting device in response to said second input position signal.

11. A control system for a fire fighting device, said control system comprising:
   a detector for detecting a position of at least a portion of the fire fighting device relative to an axis, said detector generating an output position signal indicative of the position of the at least a portion of the fire fighting device;
   a controller in communication with said detector and receiving; said output position signal; and
   a display in communication with said controller, said display generating a manipulatable icon, said icon being a graphical representation of the firefighting device, wherein an input position signal to said controller is generated in response to a manipulation of said icon, and said controller adjusting the position of the at least a portion of the fire fighting device in response to said input position signal based on said output position signal of said detector.

12. The control system according to claim 11, wherein said lire fighting device comprises a fluid delivery device.

13. The control system according to claim 12, wherein said fluid delivery device comprises a monitor.

14. The control system according to claim 13, further comprising a base, said monitor being rotatable about said base, said detector generating an output position signal indicative of the rotational position of said monitor about, said base.

15. The control system according to claim 14, further comprising a second detector, said monitor including an outlet, said outlet being rotatable about an axis, and said second detector generating an output position signal indicative of the rotational position of said owlet about said axis, and said controller adjusting the position of said monitor about said base and/or said outlet about said axis based on said input position signal and said output position signals of said detectors.

16. The control system according to claim 13, wherein said controller generates a display output signal based on said output position signal from said detector, said display generating an icon based on said display output signal, said icon being a graphical representation of said monitor, and said display configuring said icon based on said output display signal wherein the configuration of said icon indicates the position of said monitor.

17. The control system according to claim 16, wherein said icon includes a first icon, portion and a second icon portion, said second icon portion being movable with respect to said first icon portion, said second icon portion indicating the angular position of said monitor.

18. The control system according to claim 11 further comprising a second detector for detecting a second portion of the fire fighting device relative to an axis, said second detector generating a second output position signal indicative of the position of the second fire fighting component, said controller being in communication with said second detector and receiving said second output position signal;
wherein said display generates a second manipulatable icon, said second icon being a graphical representation of the portion of the at least a portion of the fire fighting device, wherein an input position signal to said controller is generated in response to a manipulation of said icon, and said controller adjusting the position of the second portion of the fire fighting component in response to said second input, position signal based on said second output position signal of said second detector.

19. A method of controlling: the position of a fire fighting device, said method comprising:
detecting the position of the fire fighting device;
generating an output position signal based on said detecting;
displaying a graphical icon based on said output position signal, wherein the configuration of said icon indicates the position of the fire fighting device;
manipulating said icon;
generating an input position signal based on the manipulating of said icon; and
adjusting the position of the fire fighting device based on said input position signal and said output position signal.

20. The method according to claim 19, wherein said detecting the position of the fire fighting device includes detecting the position of the fire fighting device with respect to two axes, said generating an output position signal includes generating an output position signal for each axis, and said adjusting including the position of the fire fighting device relative to at least one of said axes based on said input position signal and said output position signals.

21. The method of controlling the position of a fire fighting device according to claim 19, further comprising:
detecting a position of a portion of the fire fighting device;
generating a second output position signal based on said detecting;
displaying a second graphical icon based on said second output position signal, wherein the configuration of said second icon indicates the position of the portion of the fire fighting device;
manipulating said second icon;
generating a second input position signal based on the manipulating of said second icon; and
adjusting the position of the portion of the fire fighting device based on said second input position signal and said second output position signal.

22. The method of controlling the position of a fire fighting device according to claim 19, wherein said manipulating said icon step includes touching said icon and dragging said icon in an arcuate path.

23. A method of indicating the position of a fire fighting device, said method comprising:
detecting the position of the fire fighting device;
generating an output position signal based on said detecting;
generating an icon based on said output position signal;
configuring said icon as a geometrical representation of the fire fighting device;
changing the configuration of the icon to indicate the position of the fire fighting device based on said output position signal
manipulating the configuration of said icon; and
generating an input position signal in response to manipulating the configuration of said icon.

24. The method according to claim 23, wherein said detecting the position of the fire fighting device includes detecting the position of the fire fighting device with respect to two axes, said generating an icon includes generating an icon for each axis.

25. The method of indicating the position of a fire fighting device according to claim 23, further comprising:
detecting the position of a portion of the fire fighting device;
generating a second output position signal based on said detecting;
generating a second icon based on said second output position signal;
configuring said second icon as a geometrical representation of the portion of the fire fighting device;
changing the configuration of: aid second icon to indicate the position of the portion of the fire fighting device based on said second, output position signal;
manipulating the configuration of said second icon; and
generating a second input position signal in response to manipulating the configuration of said second icon.

26. The method of indicating the position of a lire fighting device according to claim 23, wherein said manipulating the configuration of said icon step includes touching the icon and dragging the icon in an arcuate path.

* * * * *